Patented Jan. 8, 1935

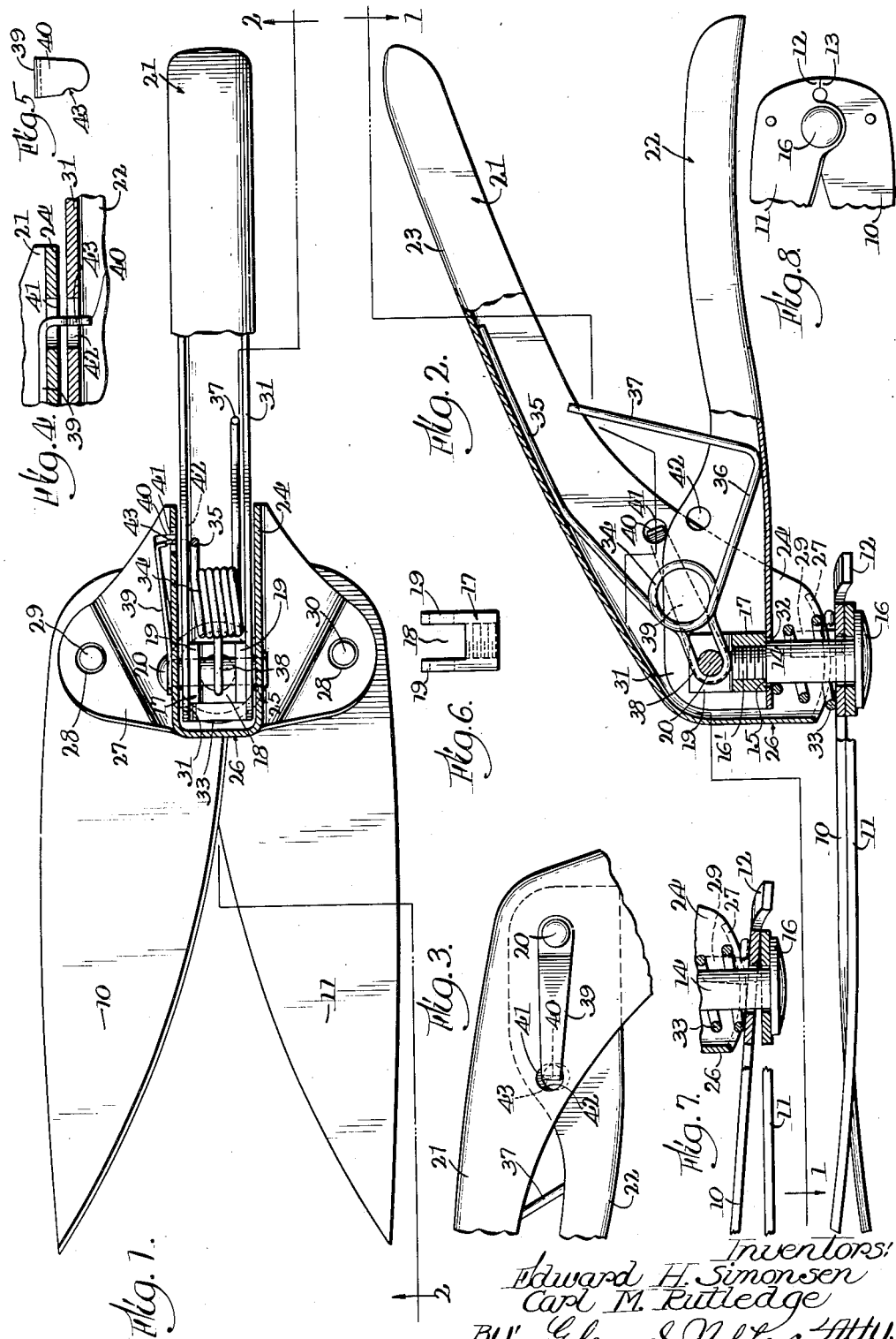

1,987,375

UNITED STATES PATENT OFFICE 1,987,375

SHEARS

Edward H. Simonsen and Carl M. Rutledge, Chicago, Ill.

Application May 16, 1934, Serial No. 725,860

7 Claims. (Cl. 30—11)

This invention relates to shears of the type in which the handles are arranged in a different plane from the blades, such shears being commonly used for cutting grass, and known as "grass shears".

The objects of this invention are to provide improved shears of this type which may be economically manufactured and which will be particularly efficient and durable in use; to provide shears of this type having a pivot pin for the operating handle which also supports the blades; to provide novel means for resiliently mounting the blades so that they may be spread apart but will return to normal cutting position; to provide novel means for holding the spring which is associated with the handles for holding the parts in normal position; to provide a catch or fastener for holding the handles with the blades in closed position; and to provide such other novel features of construction and improvements in operation as will be described more fully hereinafter.

In the accompanying drawing illustrating this invention,

Figure 1 is a plan view with parts broken away or shown in section;

Figure 2 is a side view also with parts broken away or shown in section;

Figures 3, 4 and 5 are details of the catch or handle fastening means;

Figure 6 is a detail of the pivot nut;

Figure 7 is a sectional view illustrating the possibility of separation of the blades under spring tension; and Fig. 8 is a detail showing the heels or projections at the rear ends of the blades which serve to limit the movement thereof.

The blades 10 and 11 are preferably oppositely curved as indicated in Figure 2 in order to have their cutting edges cooperate or engage throughout the entire length of the blades during the cutting movement. The rear ends of the blades are provided with heels or abutments 12 and 13 respectively to limit the opening movement. These blades are pivotally mounted on a stud or bolt 14 having a substantial head 16 for engagement with the lower blade. The upper end of the stud 14 is provided with a shoulder 15 and threaded as shown at 16' for engagement with a threaded block or nut 17. The upper portion of the block 17 is cut away or grooved at 18 to provide side bearings or upwardly extending lugs 19.

A pivot pin 20 engages with the bearings 19 and extends outwardly a sufficient distance to engage with the operating handles 21 and 22. The handle 21 is preferably made of sheet metal and shaped as shown in the drawing. It consists generally of a channel shaped handle portion 23 having downwardly projecting sides 24 with holes 25 for receiving the pivot 20. These side portions are united by a front wall 26 which serves to strengthen the handle and to make a rigid structure. The side walls 24 are continued downwardly and outwardly to provide substantially horizontal wings or bearings 27 having holes 28 therein which are engaged by studs or projections 29 and 30 extending upwardly from the blades 10 and 11 respectively. From this it will be seen that the forward portion of the handle 21 provides a box-like casing for enclosing and protecting the operating parts.

The lower handle 22 is also preferably made of sheet metal and is in general in the form of a channel, or U-shaped, in cross section. The outer portion of the handle is shaped to fit the hand while the sides 31 at the inner end are substantially parallel and fit closely within the adjacent sides of the upper handle. These sides are provided with holes for receiving the pivot pin 20. The lower wall or portion of the handle adjacent the pivot, has a hole 32 for receiving the stud 14 as shown in Figure 2, and this wall lies closely to or engages with the lower end of the nut or block 17. A spring 33 surrounds the stud 14 and is interposed between the lower face of the handle 22 and the upper blade 10. This spring is preferably of conical form with its base engaging with the blade.

The handles are held separated and the blades normally in open position by means of a spring 34 which has one end 35 engaging with the handle 21 and another portion 36 engaging with a handle 22. The lower portion or branch has an extension 37 which serves as a stop member to limit the closing movement of the handles. The branches of the spring engage with diverging portions of the handles so that there is a tendency to force the same outwardly or out of operating position. In order to hold it in such position, a branch or loop 38 is formed in the spring which passes around the pin 20 and serves to properly position and hold the spring. The loop 38 may be made integrally with the spring or a separate link may be provided if desired.

When the shears are not in use it is preferable to have the handles and blades in closed position. For this purpose we provide a spring detent or catch 39, one end of which is engaged by the pivot pin 20 for holding it in operative position. The outer or free end 40 of the spring is bent at substantially right angles to the main branch and is adapted to extend through holes 41 and 42 in the adjacent sides of the upper and lower handles respectively. The tension of the spring, or shape of the same, is such that the tip or end 40 normally projects into the hole 41 but does not engage with the hole 42 so that when in normal position the handles are free to be operated. When the handles are to be fastened in closed position, they are pressed together until the holes are in alignment as shown in Figure 4, and the end 40 is then pushed into engaging position as shown in this figure, one side of the end being provided with a notch or recess 43 for engagement with the edge of the hole 42. After the detent has been pushed into engaging position, the handles are then released and the tension of the spring 34 is such that the end portion 40 of the catch is pinched between the adjacent handle members and serves to hold the members in closed position. When the shears are to be used, the operator again presses the handles toward each other, which releases the end 40 and permits the detent to spring back to normal position out of the way of the handles.

The operation of the shears will be readily apparent from the drawing. If the lower handle for instance is considered as a fixed member the downward movement of the handle 21 causes the studs or projections 29 and 30 to move forwardly, thus swinging the blades 10 and 11, which are pivoted on the stud 14, toward closing or cutting position. When the handles are released the spring 34 tends to separate them and the reverse movement occurs, swinging the blades to open position.

In using such shears, occasionally sticks or stalks or other objects may be encountered by the blades which cannot be cut. The yielding mounting of the blades on the stud or pin 14, through the use of the spring 33, is such that, when such an object is encountered the outer or free ends of the blades may be separated to a considerable extent as indicated in Figure 7, so that the blades may pass over the article without injury to the blades. The hole through the upper blade is such that it is free to move on the pivot as indicated, and after the article or obstruction is removed from between the blades, they will be pressed back into operative position by the conical spring and their cutting edges will be held together throughout the full length thereof during the cutting stroke. The provision of such particularly free yielding movement between the blades is of special advantage in shears of this type and forms an important feature of the present invention.

While we have shown a preferred form of our invention, modifications may be made in the shape or construction of the various parts without departing from the scope of this invention and therefore we do not wish to be limited to the particular form shown and described except as specified in the following claims, in which we claim.

1. In shears, the combination of a pivot pin, upper and lower handles pivoted on said pin, a threaded block pivotally mounted on the pin between the handles, a stud engaging with said block and extending downwardly through a hole in the lower handle, a pair of blades pivotally mounted on said stud, a spring interposed between the lower handle and the blades tending to hold the blades yieldingly against the head of the stud, lateral wings on the upper handle, said wings having holes therethrough, projections on the blades engaging with said holes, a coil spring engaging with said pin and having branches engaging with the handles and tending to hold the same in normally separated position, and a resilient catch engaging with said pin and having a portion adapted to engage with the handles for holding them in closed position.

2. Shears of the character set forth, comprising handles having channel shaped pivot portions, one of said portions fitting within the other, a pivot pin engaging with said portions, a nut pivotally mounted on said pin, a stud engaging with said nut and extending through one of the handles, cutting blades pivoted on said stud, whereby they are suspended from said pin, means for holding the blades yieldingly together, and means connecting the blades with the other handle whereby the swinging movement of the handles will cause the blades to be operatively swung toward and away from each other on said stud.

3. In a cutting device of the character set forth, the combination of a pair of handles having U-shaped pivot portions, one fitting within the other, a pin extending through said pivot portions, a nut having projections pivotally engaging with said pin and positioned within the inner handle member, a stud engaging with said nut and projecting through a hole in said handle member and having a head, blades pivotally mounted on said stud, a spring interposed between the inner handle and the blades, means for operatively connecting the outer portions of the blades adjacent to the stud with the outer handle, and a spring having branches engaging with the handles and tending to separate the same, said spring also having a loop positioned between the projections on the nut and engaging with said pin.

4. A cutting tool comprising a lower handle having a channel shaped end, a pivot pin projecting through the sides of said channel shaped end, a block mounted between the sides and having a hole through which the pin passes, a pivotal member extending downwardly from said block, cutting blades pivotally mounted on said member whereby they are suspended from said pivot pin, an upper handle having a channel shaped portion fitting over the pivoted end of the lower handle and having holes through which said pin extends, wings projecting laterally from the upper handle adjacent to the pivotal portion of the blades, and studs on said blades engaging with said wings, the arrangement being such that the swinging movement of the handles will cause the blades to be actuated.

5. The combination with a pair of shears of the character set forth, having pivoted handles and having means tending to hold the handles in open position, of a resilient catch adapted to engage with the handles for holding the same in closed position, said catch being held in fastening position by the tension of the handles thereon and being adapted to be released when the handles are moved to free the same.

6. A pair of shears comprising handles having a pivot upon which they swing in one plane, a pair of cutting blades suspended from the handle pivot and adapted to swing in a plane at substantially right angles to the plane of operation of the handles, said suspending means comprising a stud passing through holes in the cutting blades and a hole through one of said handles and connected with the pivot, said blades also being operatively connected with the other handle whereby the movement of the other handle will cause the blade to be swung on the stud.

7. Shears of the character set forth comprising handles having channel shaped portions, one of said portions fitting within the other, a pivot pin engaging with said portions, a spring tending to move said handles to open position, a nut mounted on said pin, a stud engaging with the nut and extending through a hole in one of the handles, cutting blades pivoted on said stud, a spring interposed between the blades and one of said handles for holding the blades yieldingly together but permitting relative swinging movement thereof, means for operatively connecting the blades with the other handle, and a resilient catch also engaging with said pin and having a portion adapted to engage with holes in the handles for holding them in closed position.

EDWARD H. SIMONSEN.
CARL M. RUTLEDGE.